(12) United States Patent
den Boer (10) Patent No.: US 9,403,576 B2
(45) Date of Patent: Aug. 2, 2016

(54) POWER SMOOTHING CRANK ARM (71) Applicant: Willem den Boer, Brighton, MI (US)

(72) Inventor: Willem den Boer, Brighton, MI (US)

(*) Notice: Subject to any disclaimer, the term of this patent is extended or adjusted under 35 U.S.C. 154(b) by 296 days.

(21) Appl. No.: 13/962,142

(22) Filed: Aug. 8, 2013

(65) Prior Publication Data

US 2014/0041480 A1 Feb. 13, 2014

Related U.S. Application Data (60) Provisional application No. 61/682,652, filed on Aug. 13, 2012.

(51) Int. Cl.
*B62M 3/00* (2006.01)

(52) U.S. Cl.
CPC ............. *B62M 3/00* (2013.01); *Y10T 74/2168* (2015.01)

(58) Field of Classification Search
CPC ............ B62M 3/02; B62M 3/04; B62M 3/06; B62M 3/00; B62M 2003/006; Y10T 74/2167; Y10T 74/2168
See application file for complete search history.

(56) References Cited

U.S. PATENT DOCUMENTS

| | | |
|---|---|---|
| 5,060,536 A | 10/1991 | Boys |
| 5,279,524 A | 1/1994 | Hilber |
| 5,611,744 A | 3/1997 | Shen |
| 5,636,554 A | 6/1997 | Amey |
| 6,161,452 A | 12/2000 | Hilber |
| 6,640,662 B1 | 11/2003 | Baxter |
| 2012/0304810 A1 | 12/2012 | Butterfield et al. |
| 2013/0019700 A1 | 1/2013 | Matsumoto |
| 2013/0233092 A1 | 9/2013 | Tetsuka et al. |
| 2013/0255089 A1 | 10/2013 | Brosz et al. |
| 2014/0041480 A1 | 2/2014 | den Boer |

FOREIGN PATENT DOCUMENTS

| | | | | |
|---|---|---|---|---|
| DE | 19900680 A1 | * | 7/2000 | ............... B62M 3/00 |
| FR | 590471 A | * | 6/1925 | ............... B62M 3/04 |
| FR | 891873 A | * | 3/1944 | ............... B62M 3/04 |
| FR | 2608991 A2 | * | 7/1988 | ............... B62M 3/02 |

OTHER PUBLICATIONS

Johnstone, David, "Torque effectiveness and pedal smoothness", Apr. 11, 2014, 6 pages.
Bertucci, William, et al. "Effects on the Crank Torque Profile when Changing Pedalling Cadence in Level Ground and Uphill Road Cycling." Journal of Biomechanics, vol. 38, No. 5, pp. 1003-1010, Mar. 2005.
Larsen, Ben., "Rotor Cranks: Power to the People," http://autobus.cyclingnews.com/tech/?id=2002/reviews/rotor_cranks, Available as early as Jan. 2002, 4 pages.
Rasmussen, John, et al. "Ergonomic Optimization of a Spring-Loaded Bicycle Crank.", The 6th World Congresses of Structural and Multidisciplinary Optimization, Rio de Janeiro, Brazil, May-Jun. 2005, 8 pages.
SA Korean Intellectual Property Office, International Search Report and Written Opinion Issued in Application No PCT/US2016/018309, May 11, 2016, WIPO, 11 pages.

* cited by examiner

*Primary Examiner* — Thomas Diaz
(74) *Attorney, Agent, or Firm* — Alleman Hall McCoy Russell & Tuttle LLP (57) ABSTRACT

A crank arm for a pedal-driven vehicle is described herein. The crank arm includes a first member that pivots about a crank axis of the pedal-driven vehicle and a second member rotationally coupled to the first member and configured to receive a pedal. The crank arm further includes a spring assembly configured to bias the second member towards a neutral rotation configuration relative to the first member and to resist rotation of the second member away from the neutral rotation configuration, wherein a distance between the crank axis and the pedal interface is greater than a distance between the crank axis and the member pivot point when the second member is in the neutral rotation configuration.

19 Claims, 5 Drawing Sheets

POWER SMOOTHING CRANK ARM

CROSS REFERENCE TO RELATED APPLICATION

This application claims priority to U.S. Provisional Application No. 61/682,652, filed Aug. 13, 2012 and entitled POWER SMOOTHING BICYCLE CRANK SET, the entire contents of which are hereby incorporated herein by reference.

BACKGROUND

When pedaling a bicycle or other pedal drive vehicle, a large amount of pedaling force may be transferred from the crank to the drive wheel(s) when the cranks are close to a horizontal position. However, it may be desirable to have substantially constant force during the revolution of the pedals, even torque at all times. The human body is able to put more force on the pedals when the crank is closer to horizontal, (i.e., pushing down on the pedal for the crank moving downward and pulling up on the opposite pedal for the crank moving upward). When the cranks are closer to a vertical position, the feet produce forward horizontal force on one pedal and backward horizontal force on the opposite pedal. The human body typically does not produce the same force in these "dead spots" of the revolution cycle, due to a person's biomechanics. In other words, the torque curve of a crank assembly through a full crank stroke may have sharp torque spikes and valleys. As a result, drive wheel traction may be reduced when the torque spikes are transferred to the drive wheel via a drivetrain. Moreover, a user's muscles may become fatigued more quickly when they exert uneven pedal forces during the crank stroke, which may lead to exhaustion, decreased power output and therefore vehicle speed.

Several attempts have been made to remedy the "dead spot" problem. For instance, elliptical or oval chain rings have been developed in an effort to decrease the magnitude of the peaks and valleys in a crank's torque curve. For instance, elliptical or oval chain rings are available on the market under the names O'Symetric, Biopace chain wheel, Rotor Q-ring and Ridea® Power Ring. Additionally, U.S. Pat. No. 5,636,554 discloses a variable length crank arm where a secondary crank arm is biased towards a retracted position. Furthermore, U.S. Pat. No. 5,611,744 discloses a variable shape chain ring which deforms in shape during a crank stroke in an effort to even out the crank's torque curve. Other solutions include, a spring-loaded bicycle cranks such as the cranks disclosed in U.S. Pat. No. 5,279,524 and U.S. Pat. No. 6,161,452. The spring-loaded bicycle cranks include a spring coupled to a crank arm and a chain ring. Other types of spring-loaded cranks may include two springs suspended between the frame and the chain crank mechanism.

Yet another attempt to remedy the problem of "dead spots" includes a Rotor Crank in which the cranks are not fixed at 180°, but are variable during a pedal cycle. The cranks are synchronized through a set of cams that change the angle between the crank arms producing a variation in transmission ratio during each cycle. The system relies on an eccentric bearing on the bottom bracket and the right crank movement is then controlled by the two cams accelerating the crank through the "dead spot" at the top and bottom of the pedal stroke and prolonging the power stroke phase. By the time one crank is at the bottom of the stroke and in the six o'clock position, the opposite crank has been accelerated through to the one o'clock position and has already started the power stroke phase.

Each of the designs listed above have multiple drawbacks. For instance, each of the designs may be costly. As a result, none of the designs have been widely adopted. Additionally, drawbacks of oval chain rings include making it more difficult to switch gears in the vehicle and in many oval type crank assemblies only the outer chain ring is oval, limiting the amount of gear ratios where the "dead spots" can be attenuated. Additionally, the use of an oval chain ring leads to slack and rattling of the chain. Still further, the degree of ellipticity of the chain ring cannot be changed and is therefore typically not suited for every riding condition. For example, on a 10° or higher riding surface slope an oval shape with the longer diameter perpendicular to the crank may actually be disadvantageous, while on flat terrain it is beneficial. This is because the dead spot reduction remains perpendicular to the riding surface (i.e., at 10° off vertical) rather than moving to the vertical position which is much more beneficial. Furthermore, the variable length crank arm disclosed in U.S. Pat. No. 5,636,554 stores energy in the arm when a distance between an aperture for a pedal and a rotational axis of the crank arm is increased. This configuration may lead to an undesirable path of the pedal, which may cause undue stress and strain on a rider's joints, ligaments, and muscles. Consequently, the likelihood of a rider developing injuries from the variable length crank arm disclosed in U.S. Pat. No. 5,636,554 is increased.

In the Rotor crank the chain wheel and the crank also rotate independently. Compatibility with conventional frames has been resolved for the rotor crank, but its weight is significantly increased and, like the oval chain ring, only one setting exists, which may not fit all riding conditions (e.g., uphill, time trial, sudden accelerations). With regard to spring-loaded type bicycle cranks they may necessitate a total redesign of the crank set, due to the fact that the crank and chain wheel rotate independently. Consequently, a specialized frame may be necessitated for use with the spring-loaded crank due to the configuration of the chain wheel and crank, making the crank set incompatible with many types of frames. As a result, none of the aforementioned designs has been widely adopted.

SUMMARY

To solve at least some of the aforementioned problems a crank arm is provided. The crank arm includes a first member that pivots about a crank axis of the pedal-driven vehicle and a second member rotationally coupled to the first member and configured to receive a pedal. The crank arm further includes a spring assembly configured to bias the second member towards a neutral rotation configuration relative to the first member and to resist rotation of the second member away from the neutral rotation configuration, wherein a distance between the crank axis and the pedal interface is greater than a distance between the crank axis and the member pivot point when the second member is in the neutral rotation configuration.

Biasing the second member towards neutral rotation enables the crank arm to store and release energy during portions of the crank stroke. Consequently, the magnitude of torque spikes in the crank stroke are reduced, providing a more even torque curve throughout the crank stroke, which may delay the onset of rider fatigue as well as increase the power output and speed of the pedal drive vehicle. Specifically, the crank arm may provide a 2% or greater increase in output and speed when compared to crank arms which may include a single rotational member coupled to a pedal. For competitive cyclists, a few percent increase in speed and/or power may provide a competitive edge and enable them to advance in race standings. Furthermore, traction of a drive wheel mechanically coupled to the crank arm may be increased when the peaks and valleys in the torque curve are attenuated. Still further, when a distance between the crank axis and the pedal decreases as the second member rotates away from the neutral rotation, the amount of stress and strain on a rider's joints, tendons, and/or muscles throughout the pedal stroke may be reduced. As a result, the likelihood of developing repetitive stress and strain injuries from the crank arm is reduced.

DETAILED DESCRIPTION

Figure 1:
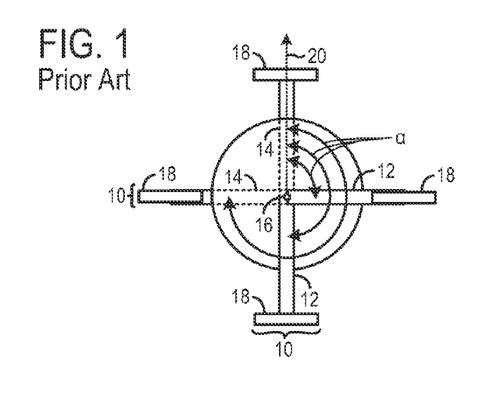
FIG. 1 shows a schematic depiction of a prior art crank arm.

FIG. 1 shows a prior art crank arm assembly 10 including a first crank arm 12 and a second crank arm 14 at two different positions in the crank stroke. Each of the crank arms are coupled to pedals 18. As shown, the first and second crank arms (12 and 14) rotate about a crank axis 16. Crank angle α is measured between a vertical axis 20 and the crank arms (12 and 14).

Figure 2:
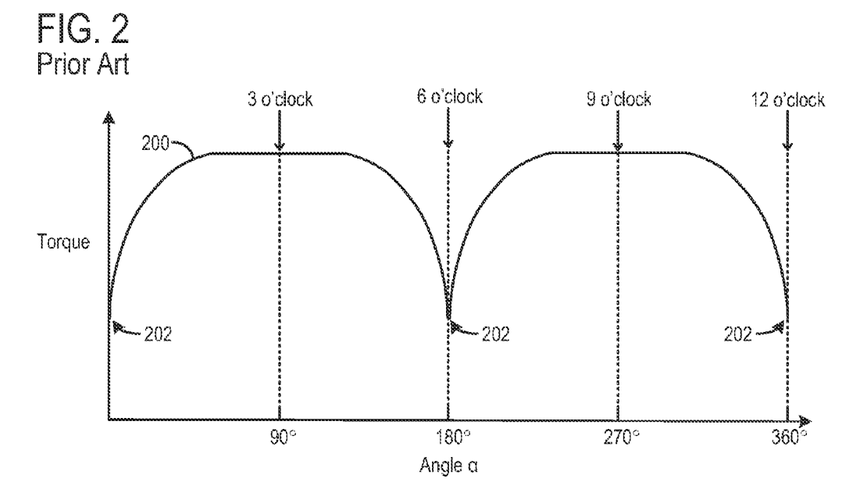
FIG. 2 shows a graph depicting a torque curve of the prior art crank arm shown in FIG. 1.

FIG. 2 shows a torque curve 200 of the prior art crank arm assembly 10 shown in FIG. 1. Specifically, FIG. 2 shows a graph of the toque vs. crank angle α of the prior art crank arm assembly. As illustrated, the dead spots 202 are at 180° and 360° (i.e., 0°). The dead spots 202 are defined as the lowest points on the torque curve. It will be appreciated that quantitative curves for different riders depends on riding style and technique of the particular rider. However, it will be appreciated that the dead spots may generally be around the 180° and 360° positions. The maximum torque, around 90° and 270°, may be several times higher than the minimum torque at the dead spots.

Figure 3:
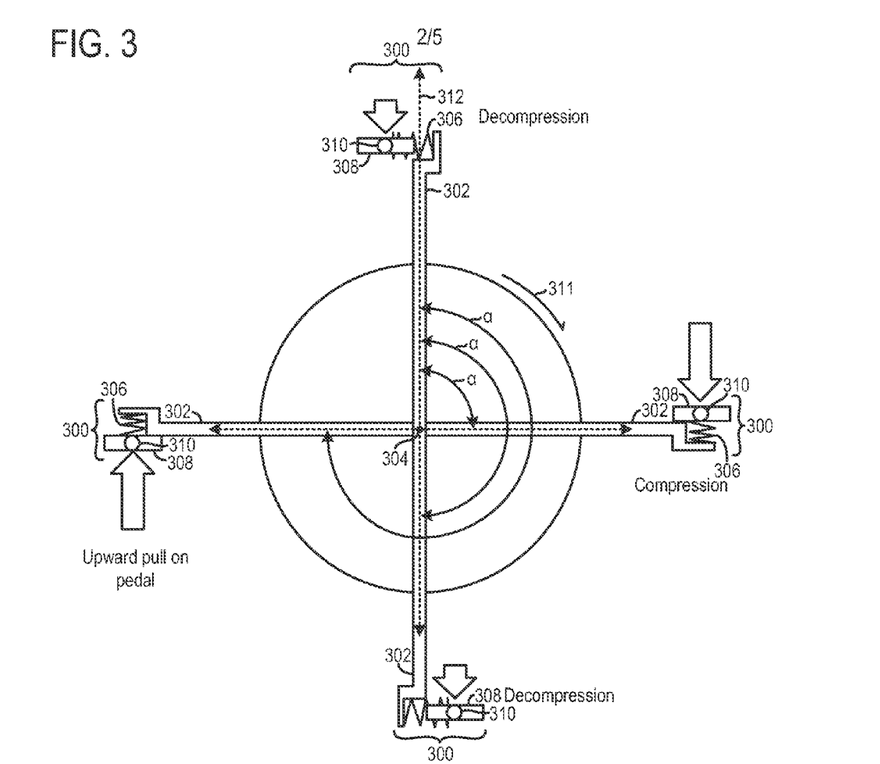
FIG. 3 shows a first embodiment of a crank arm.

FIG. 3 schematically shows a crank arm 300 in accordance with a first embodiment of this disclosure. The crank arm 300 decreases dead spots in the torque curve of the crank arm while mitigating and/or avoiding at least some of the drawbacks of the aforementioned types of crank assemblies.

It will be appreciated that the crank arm 300 may be included in a pedal driven vehicle such as a unicycle, bicycle, tricycle, quadracycle, rickshaw cycle, pedal-driven boat, pedal-driven aircraft, etc. Four positions of the crank arm 300 are simultaneously illustrated in a single diagram to show the behavior of the crank arm in different portions of the crank stroke. Although a single crank arm is shown in FIG. 3, it will be appreciated that a second crank arm typically is included in a crank set of the pedal driven vehicle. The second crank arm may have similar functional characteristics and geometry as the first crank arm. The second crank arm may be positioned at 180° with respect to the first crank arm, in one example. However, other relative positions of the first and second crank arms have been contemplated. Moreover, the crank arms may be positioned on opposing sides of the pedal driven vehicle (e.g., a bicycle). Therefore, the crank arms may be referred to as right and left crank arms.

The crank arm 300 includes a member 302 configured to rotate about a crank axis 304. The member 302 is attached to a spring assembly 306. The spring assembly 306 is attached to a pedal 308 via a pedal interface 310. The spring assembly 306 is configured to store energy in the form of potential energy and release the stored energy during portions of the crank stroke. Arrow 311 indicates the direction of rotation of the crank arm 300. A clockwise direction of crank arm rotation is depicted. However in other examples, the crank arm may be rotated in a counterclockwise direction.

It is believed that storing and releasing potential energy via the spring assembly 306 reduces (e.g., substantially eliminates) the dead spots during crank strokes and provides a more even torque on a drive wheel. As a result, the onset of rider fatigue may be delayed and/or the power output and speed of the pedal driven vehicle may be increased. Furthermore, traction of a drive wheel mechanically coupled to the crank arm may be increased when the dead spots are attenuated.

Specifically, when an angle α of the crank arm 300 is close to a 180° and 360° (i.e., 6 o'clock and 12 o'clock) the potential energy in the spring assembly is released. Again, angle α is measured from a vertical axis 312 and the crank arm 300. When the angle α is 180° the force on the pedal, if any, becomes perpendicular to the compression direction of the spring, allowing the spring to decompress. At this time the springs are oriented horizontally, so that the energy is released in the rotation direction, increasing the torque.

Figure 4:
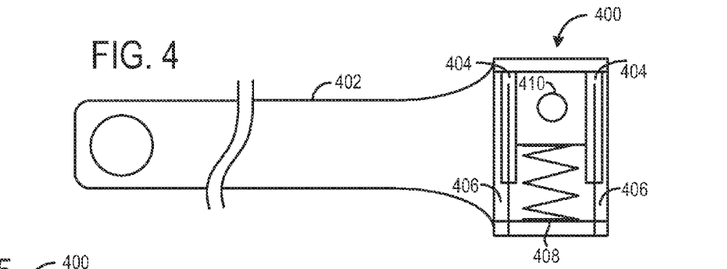
FIGS. 4 and 5 show an example spring assembly which may be used in the crank arm shown in FIG. 3.
Figure 5:
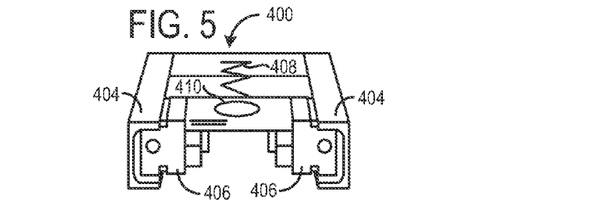

FIGS. 4 and 5 show an example spring assembly 400. It will be appreciated that the spring assembly 400 shown in FIGS. 4 and 5 may be similar to the spring assembly 306 shown in FIG. 3. As shown, the spring assembly 400 is coupled to a member 402. As discussed above with regard to FIG. 3 the spring assembly and the member are included in a crank arm.

Continuing with FIGS. 4 and 5, the spring assembly 400 may include sliders 404 on a set of rails 406. The rails 406 guide movement of each respective slider 404, with low friction, for example. Thus, the rails 406 may at least partially enclose each respective slider. The rails 406 may be rigidly attached the member 402 or they may be part of the member. A single elastic compression spring 408 is used for both of the sliders 404 and rails 406, in the depicted embodiment. However, in other embodiments an elastic compression spring may be used for each pair of rail and slider.

It will be appreciated that a variety of springs and/or other elastic elements may be utilized in the spring assembly 400 shown in FIGS. 4 and 5. For example, the spring 408 may be a spring with an outer diameter of 0.75 inches, a wire diameter of 0.125 inches, a length of 4 inches, a solid height of 2.672 inches, and/or spring constant of 86 lbs/inch. A spring having the aforementioned characteristics can store a potential energy of 8.58 Joules in the spring, when it is fully compressed from the free-standing length. The energy may be released during the decompression near the 6 o'clock and/or 12 o'clock positions of the cranks, in one example. When an average power (e.g., 200 to 300 Watts) is exerted by the cyclist, the reduction in torque at the dead spots may be substantially reduced (e.g., eliminated) via the spring assembly 400.

Furthermore, springs with different spring constants and other parameters may be selected for individual riders with different weight, power capabilities, and skill levels, and for different riding conditions. Other energy-storing devices, different from compression springs, may be considered as well, such as devices based on gas compression, liquid compression, and hydraulics.

During the downward crank stroke and/or upward crank stroke, from about 1 to 5 o'clock and from about 7 o'clock to 11 o'clock, the spring 408 is compressed and a potential energy E is stored in the spring:

$$E = \frac{1}{2}kx^2,$$

where k is the spring constant or rate and x is the change in length of the compression spring. In one example, k may be chosen so that at maximum force on the pedal during the down stroke the spring will be substantially compressed (e.g., completely compressed) to its solid height. The maximum value of x may be on the order of 2.54 centimeters (cm), although values between about 1 cm and 5 cm, or even longer, have been contemplated. However, other techniques may be used to select the spring constant. The potential energy of the spring may be stored while the spring is near the vertical position.

It will be appreciated that a second crank arm may also include a second spring assembly similar to the spring assembly 400. However, in other examples, the spring assemblies may not be substantially equivalent. For instance, the spring constants of the two spring assemblies may not be equal, to accommodate differences in left and right pedaling forces of the rider.

The sliders 404 and rails 406 shown in FIGS. 4 and 5 may be integrated into a crank set and be made of light material, such as aluminum alloys, titanium, or carbon fiber to reduce (e.g., minimize) weight. Thus, the compactness of the crank set may be increased and/or the weight of the crank set may be reduced, if desired. It is to be understood that any suitable spring assembly may be used without departing from the scope of this disclosure.

The spring assembly 400 shown in FIGS. 4 and 5 may optionally include compact rails and roller based sliders, where the pedals are attached to the sliders. A pair of 18 millimeters (mm) wide rails, as shown in FIG. 5, in combination with sliders with four rollers may be included in the spring assembly. This type of assembly configuration would be able to withstand the loads and torques applied in substantially any direction by the pressure on the pedal, including a weight of a rider. In FIG. 5 the angle between the crank and the compression direction of the spring is 90°. Other angles, e.g. between 70° and 120° may be used as well. A pedal interface 410 configured to attach to a pedal is also included in the spring assembly 400. The pedal interface 410 may include a threaded opening and/or other suitable attachment features enabling the aforementioned connection between the pedal and the spring assembly.

Figure 6:
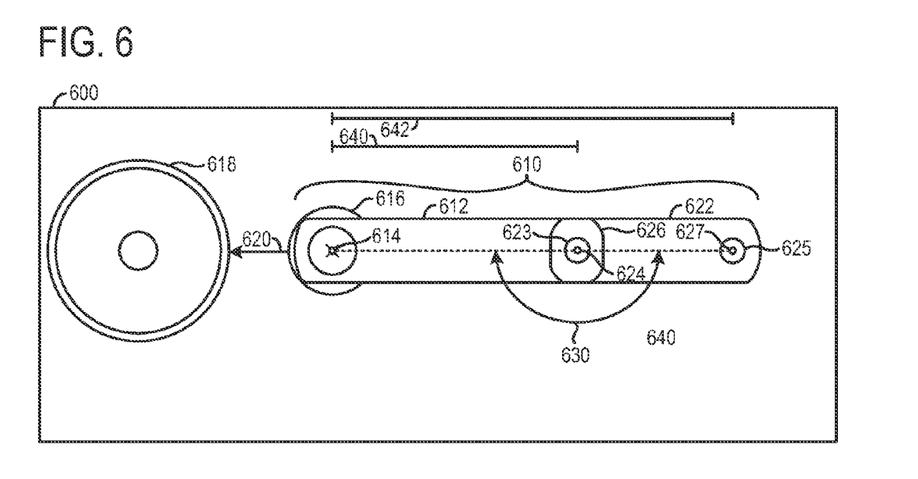
FIGS. 6 and 7 show a second embodiment of a crank arm.
Figure 7:
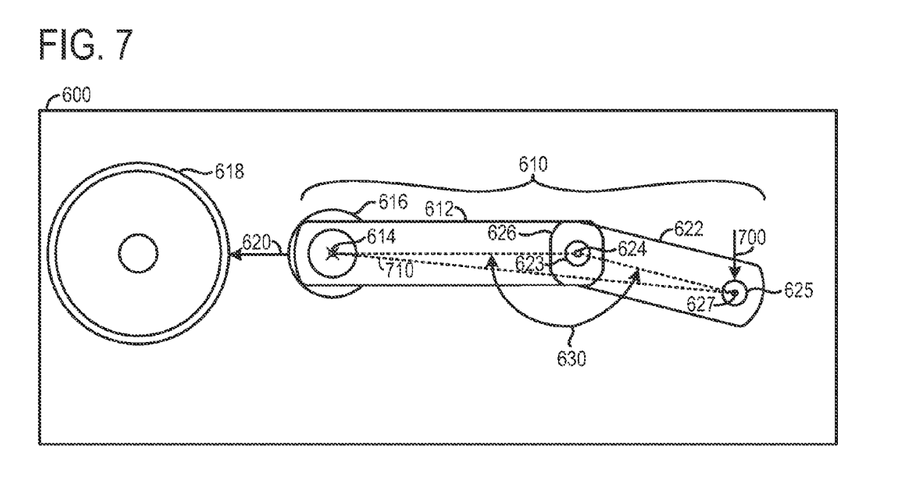

FIGS. 6 and 7 show a second embodiment of a crank arm 610. The crank arm 610 is included in a generically depicted pedal driven vehicle 600. The pedal driven vehicle may be any suitable pedal drive vehicle such as a unicycle, bicycle, a tricycle, quadracycles, a cycle rickshaw, pedal-driven boat, pedal-driven aircraft, etc. The crank arm 610 includes a first member 612 rotating about a crank axis 614 of the pedal drive vehicle 600. The first member 612 may be coupled to a bearing assembly 616 which is configured to enable rotation of the first member about the crank axis 614. In one example, the bearing assembly 616 may be a conventional bottom bracket in a bicycle. In such an example, the bottom bracket may be attached to a bicycle frame and include a spindle and bearings enabling the spindle to rotate.

The first member 612 may also be coupled (e.g., mechanically coupled) to a drive wheel 618. The coupling of the first member 612 to the drive wheel 618 is indicated via arrow 620. A suitable drivetrain may be used to facilitate the mechanical coupling of the first member 612 to the drive wheel 618. For instance, the first member 612 may be coupled to one or more chain rings (not shown) which may in turn be mechanically coupled to the drive wheel via a chain (not shown) and a sprocket (not shown). However, other types of drivetrains have been contemplated, such as belt drive type drivetrains and drivetrains that utilize a drive shaft. Further it will be appreciated that the drivetrain may be a shift type drive train, enabling a user to select a desired gear ratio for the vehicle. Further still it will be appreciated that the member 302 shown in FIG. 3 and/or the member 402 shown in FIG. 4 may be mechanically coupled to a drive wheel, such as the drive wheel 618 shown in FIG. 6, via a suitable drivetrain, as described above.

Although a single crank arm 610 is illustrated in FIG. 6, it will be appreciated that the pedal drive vehicle 600 may include a second crank arm (not shown). The second crank arm may be arranged at 180° angle with regard to the first crank arm, in one example. However, other relative positions of the first and second crank arms have been contemplated.

A second member 622 included in the crank arm is rotationally coupled to the first member 612 at a pivot point 624. In other words, the second member is moveably coupled to the first member. The pivot point 624 may be referred to as a member pivot point. A bearing assembly 623 coupled to the first member 612 and the second member 622 may be included in the crank arm 610 and configured to enable rotation of the second member 622 about the pivot point 624. In this way, the relative position of the first and second members may be rotationally altered. The second member 622 includes a pedal interface 625. The pedal interface 625 is configured to enable a pedal to be coupled to the second member 622. For instance, the pedal interface 625 may include a threaded opening configured to receive a threaded pedal axle. The pedal interface 625 includes a pedal pivot point 627. A pedal may rotate about the pedal pivot point.

A spring assembly 626 is also included in the crank arm 610. The spring assembly 626 is coupled to the first member 612 and the second member 622. Specifically, the spring assembly 626 is operatively connected intermediate the first member 612 and the second member 622. The spring assembly 626 may include a torsion spring, discussed in greater detail herein. Furthermore, the spring assembly 626 is configured to bias the second member 622 towards a neutral rotation configuration relative to the first member 612 and to resist rotation of the second member away from the neutral rotation configuration. Consequently, the spring assembly 626 enables the crank arm 610 to save pedal force as potential energy when the second member 622 is rotated away from the neutral configuration in the direction of rotation of the crank and release this potential energy when the second member returns toward the neutral configuration. It will be appreciated that rotation away from the neutral position against the direction of rotation of the crank is counterproductive with regard to increasing torque applied to the drive wheel during the crank stroke.

FIG. 6 shows the second member 622 in a neutral rotation configuration. As illustrated, the crank axis 614, the pivot point 624, and the pedal interface 625 are collinear with the pivot point between the crank axis and the pedal interface, when the second member is in the neutral rotation configuration. Thus, the crank axis 614, the pivot point 624, and the pedal interface 625 form a 180° angle, indicated at 630, in the neutral rotation configuration. Therefore, the neutral rotation configuration may correspond to a maximum distance between the crank axis and the pedal interface. Angle 630 is shown measured in a counterclockwise direction from the line extending between the crank axis and the pivot point to the line extending between the pivot point and the pedal interface. It will be appreciated that in other examples the angle between the crank axis, pivot point, and pedal interface may be measured in a clockwise direction. Furthermore, other neutral rotation configurations have been contemplated. For instance, the crank axis 614, the pivot point 624, and the pedal interface 625 may form a 170°, 175°, 185°, 190° or 200° in the neutral position, in other embodiments.

Additionally, the first member 612 may be between 60% and 250% as long as the second member 622, in different embodiments. When the length of the first member is within the aforementioned range, the torque applied to the spring assembly 626 may be maintained within a desirable range. As a result, a desired amount of torque may be applied to the spring assembly 626 and the likelihood of spring assembly damage or degradation from overstressing is reduced.

Additionally in the example depicted in FIG. 6, a distance between the crank axis 614 and the pedal interface 625, indicated at 640, is greater than a distance between the crank axis and the member pivot point 624, indicated at 642, when the second member 622 is in the neutral rotation configuration.

FIG. 7 shows the second member 622 in a non-neutral rotation configuration where a force, indicated via arrow 700, is applied to the pedal interface 625 in the rotation direction of 612, by a rider for example. Therefore, it will be appreciated that the spring assembly 626 urges the second member 622 toward the neutral rotation configuration in the crank arm 610 shown in FIG. 7. Thus, the spring assembly 626 stores potential energy when the second member 622 is moved away from the neutral rotation configuration, shown in FIG. 6, and releases energy when the second member is moved toward the neutral rotation configuration. The potential energy stored in the torsion spring is given by the equation $$E=\frac{1}{2}k\Theta^2,$$

where k is the torsion spring constant and Θ is the deflection angle. It will be appreciated that the spring assembly 626 is not configured to store energy in the neutral rotation configuration, unless it is preloaded and a return stop prevents further backward rotation. FIG. 7 also shows a distance 710 between the crank axis 614 and the pedal interface 625. It will be appreciated that the distance 710 decreases as the second member 622 rotates away from the neutral rotation configuration and increases when the second member returns towards the neutral configuration, when the neutral position is at 180°. However, when the neutral position is less than 180° the distance between the crank axis 614 and the pedal interface 625 decreases as the second member is rotated away from the neutral configuration in a clockwise direction (i.e., in the direction of crankshaft rotation). On the other hand, when the neutral position is greater than 180° the distance between the crank axis and the pedal interface increases as the second member is rotated away from the neutral configuration in a clockwise direction until the angle between the first and second member is 180°. Further in such an example, the distance between the crank axis and the pedal interface decreases as the second member is rotated away from the neutral configuration in a clockwise direction (i.e., in the direction of crankshaft rotation) when the angle between the first and second member is greater than 180°.

In one example, the spring assembly 626 is configured to limit movement of the second member 622 relative to the first member 612 between a 135° and 180° angle, the angle indicated at 630. As discussed above, the angle 630 measured between the crank axis 614, the pivot point 624, and the pedal interface 625. In this way, the path of the pedal during a crank stroke may be maintained within a desirable boundary. As a result, the stress and strain on a rider's muscles, joints, ligaments, etc., throughout a pedal stroke may be reduced. Additionally or alternatively, stops included in the crank arm may be configured to limit the movement of the second member with regard to the first member. The stops are discussed in greater detail herein with regard to FIG. 9.

Figure 8:
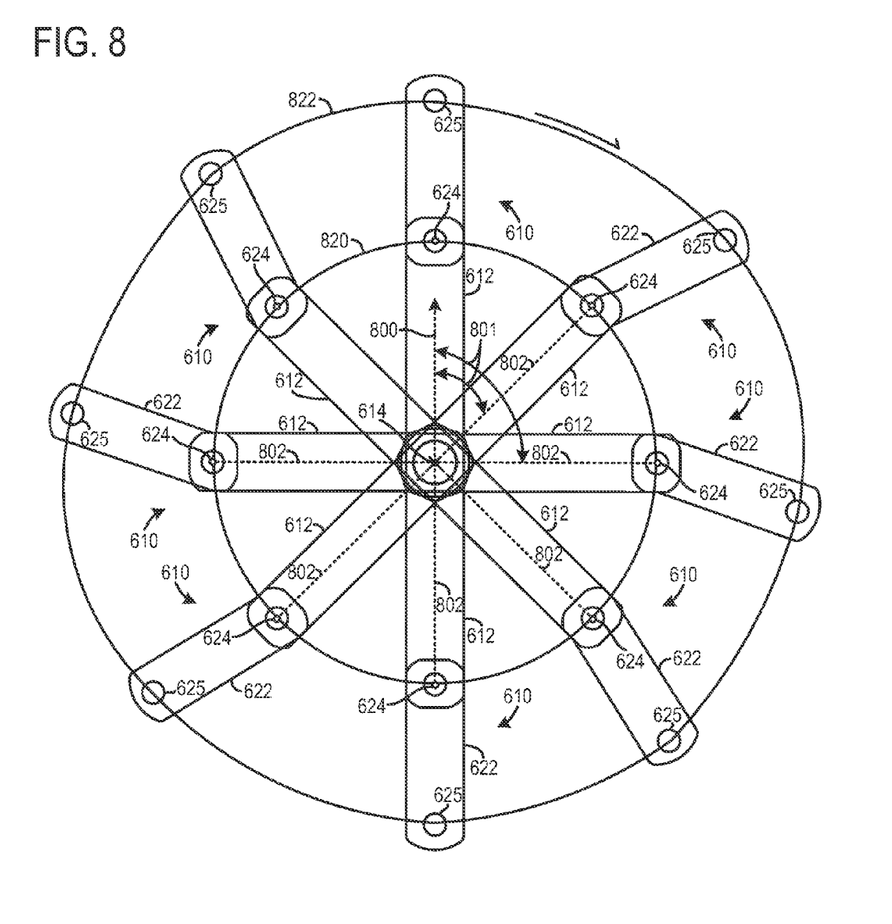
FIG. 8 shows the crank arm depicted in FIGS. 6 and 7 at multiple locations in the crank stroke.

FIG. 8 shows the crank arm 610, illustrated in FIGS. 6 and 7 being rotated clockwise about the crank axis 614 via pedal input from a rider. A number of positions of the crank arm 610 are simultaneously illustrated to depict the path of the crank arm throughout a crank stroke. An angle 801 of the various positions of the crank arm 610 in the crank stroke may be measured from a vertical axis 800 extending from the crank axis 614 to a line 802 extending from the crank axis to the pivot point 624. Thus, the angle 801 measures the rotation of the first member 612 with regard to the vertical axis 800. It will be appreciated that the vertical axis 800 may be parallel to a gravitational axis.

The crank stroke may be conceptually divided into an upward crank stroke and a downward crank stroke. The downwards crank stroke may be the rotational range of the first member 612 from a 0° angle to a 180° angle in a clockwise direction. On the other hand, the upward crank stroke may be the rotational range of the first member 612 from a 180° angle to a 360° angle in a clockwise direction.

The spring assembly 626 is configured to store and release energy during both the downward crank stroke as well as the upward crank stroke. For instance, when the angle 801 is 90° the second member 622 is rotated away from the neutral rotation configuration and therefore is storing potential energy. At the bottom of the crank stroke when the angle 801 is 180°, most or all of the energy stored in the spring assembly 626 was released in a preceding portion of the stroke and therefore the spring assembly is storing little or no potential energy at the bottom of the crank stroke. This release of potential energy increases the amount of torque applied to by the crank arm near the bottom of the crank stroke. As a result, the magnitude of one of the valleys (i.e., "dead spot") in the crank arm's torque curve is reduced.

Additionally, in the example depicted in FIG. 8, a rider is exerting an upward force on the pedal interface 625 during the upward crank stroke. Therefore, it will be appreciated that the pedal coupled to the pedal interface may include toe clips, clipless pedals, and/or other suitable device configured to enable a user to impart an upward force on the second member 622 throughout the upward crank stroke. However, in other examples downward force may be exerted during the upward crank stroke. The return stop prevents the spring assembly from storing counterproductive potential energy, in this case. When the angle 801 is 270° the second member 622 is again rotated away from the neutral rotation configuration and storing energy. This energy is released through a subsequent portion of the crank stroke and when the angle 801 is 360° most or all of the energy was previously released. In this way, the magnitude of another valley (i.e., "dead spot") in the crank arm's torque curve is reduced, providing a more even torque curve throughout the crank stroke. This type of torque curve is believed to increase traction of a drive wheel mechanically coupled to the crank arm and may increase the power output and/or speed of the pedal drive vehicle and/or delay the onset of rider fatigue.

Additionally, the distance between the crank axis 614 and the pivot point 624 is less than the distance between the crank axis and the pedal interface 625 throughout the downward and upward crank strokes, in the embodiment depicted in FIG. 8. However, other rotational characteristics of the crank arm have been contemplated.

A path 820 of the pivot point 624 is also shown in FIG. 8. The path is substantially circular. Additionally, a path 822 of the pedal interface 625 is shown. The path of the pedal interface is not circular due to decreasing distance between the pedal interface and the crank axis when the second member is in a non-neutral configuration.

Figure 9:
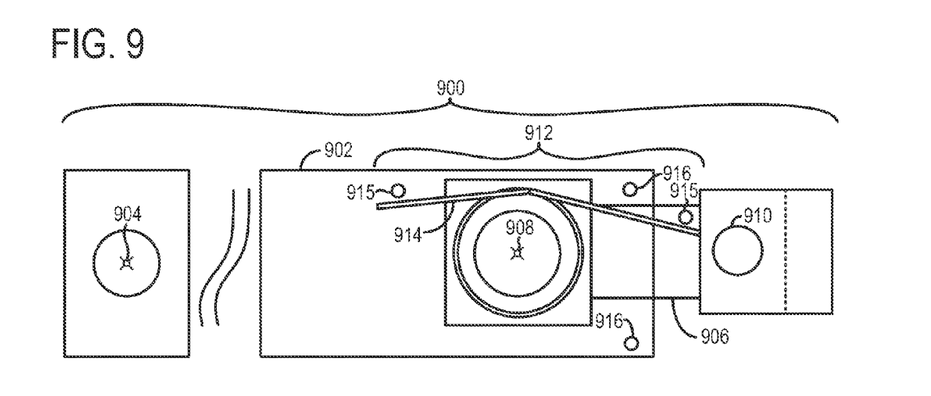
FIGS. 9 and 10 show a third embodiment of a crank arm.

FIG. 9 shows a third embodiment of a crank arm 900. The crank arm 900 may have similar functional and/or geometric characteristics to the crank arm 610 shown in FIGS. 6-8. As such, the functional description of crank arm 610 may apply to crank arm 900 and vice versa. Again the crank arm 900 includes a first member 902 pivoting about a crank axis 904. The crank arm 900 further includes a second member 906 coupled to the first member 902 at a pivot point 908. The second member 906 includes a pedal interface 910. The crank arm 900 further includes a spring assembly 912. The spring assembly 912 may have a similar functionality to the spring assembly 626, shown in FIG. 6-8. Therefore, the spring assembly 912 is configured to store potential energy when the second member 906 is moved away from the neutral rotation configuration and release energy when the second member is moved toward the neutral rotation configuration. Again, the crank axis 904, the pivot point 908, and the pedal interface 910 are collinear with the pivot point between the crank axis and the pedal interface in the neutral configuration. The spring assembly 912 includes a torsion spring 914 coupled to the first member 902 and the second member 906. Protrusions 915 coupled to the first member 902 and the second member 906, respectively, enable the torsion spring 914 to engage the first and second members. The crank arm 900 also includes stops 916 coupled (e.g., directly coupled) to the first member 902 and configured to bound the movement of the second member 906 with regard to the first member 902. Two stops are depicted in FIG. 9. However an alternate numbers of stops may be used. In one example, the stops 916 are configured to limit the second member 906 from rotating more than 90° from the neutral rotation configuration. The second member 906 is therefore positioned between the stops 916. It will be appreciated that the angle may be measured in a clockwise or counterclockwise direction. In this way the stops 916 bound the movement of the second member between the 135° and 200° angle. Further still in one example, the stops 916 are configured to limit the second member 906 from rotating more than 45° from the neutral rotation configuration. Bounding the movement of the second member in the way may decrease the likelihood of a rider overly straining or stressing their joints, muscles, ligaments, etc., during pedal strokes.

Figure 10:
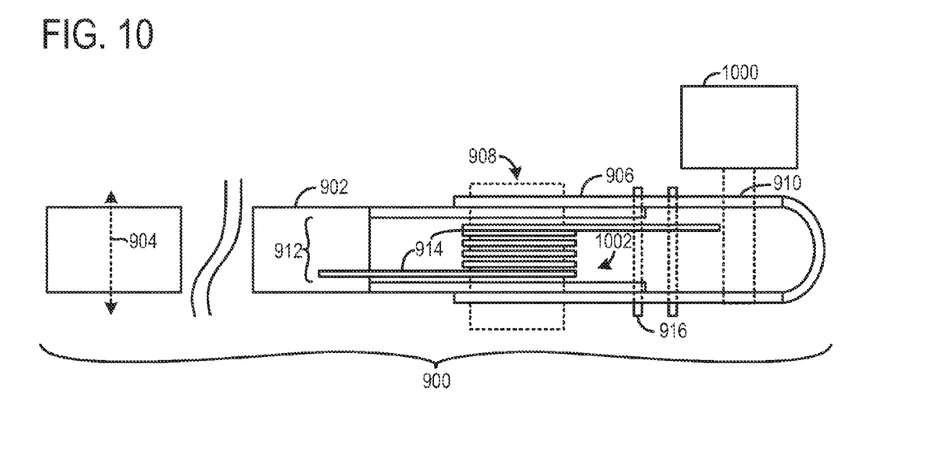

FIG. 10 shows another view of the crank arm 900 shown in FIG. 9. Again the first member 902, the crank axis 904, the second member 906, the pivot point 908, the pedal interface 910, the spring assembly 912, the torsion spring 914, and one of the stops 916 are shown. A pedal 1000 coupled to the pedal interface 910 is also depicted. As shown, the torsion spring 914 is at least partially enclosed by the first member 902 and the second member 906. Thus, the first and second members include a central opening 1002 receiving the torsion spring. Additionally, the stops 916 laterally extend through the second member 906.

Figure 11:
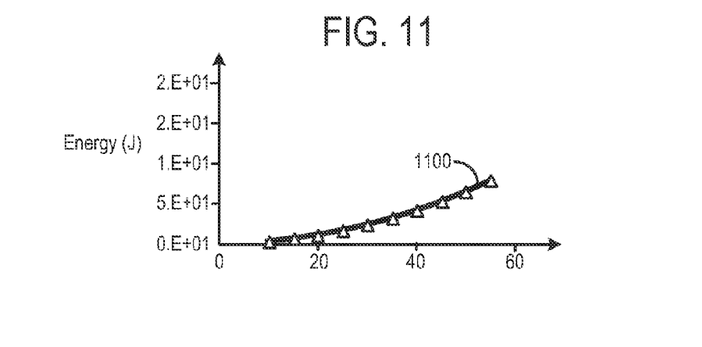
FIG. 11 shows the energy vs. the angle of deflection in an example torsion spring.

FIG. 11 shows a plotted curve 1100 of the useful potential energy in an example torsion spring vs. the angle of deflection of the spring. It will be appreciated that torsion spring used for the plot may be included in one or more of the spring assemblies discussed above with regard to FIGS. 3-11. In the neutral position the angle the angle between the legs of the torsion spring is preloaded by 10° as shown in the example of FIG. 9. Additionally, the spring constant of the example torsion spring is 0.3 Nm/degree. However, crank arms including torsion springs having other spring constants and/or neutral angles may be utilized. For instance, a spring constant of the torsion spring may be between 0.3 and 2 Nm/degree. Further, it will be appreciated that the thickness of a coil in the torsion spring may be adjusted to alter the spring constant of the torsion spring. Moreover the number of turns in the coil may also be adjusted to alter the spring constant. For instance, the torsion spring may have between 3 and 7 coil turns in one example. Further in some examples, the torsion spring may have a length of between 0.25 and 1.25 inches, the outer diameter of the turns may be between 0.5 and 1.5 inches, and/or the diameter of the coil wire may be between 0.05 and 0.2 inches.

Finally, it will be understood that the articles and systems described hereinabove are non-limiting examples for which numerous variations and extensions are contemplated. Accordingly, this disclosure includes all novel and non-obvious combinations and sub-combinations of the articles and systems disclosed herein, as well as any and all equivalents thereof.

The invention claimed is:

1. A crank arm for a pedal-driven vehicle, comprising:
    a first member that pivots about a crank axis of the pedal-driven vehicle;
    a second member rotationally coupled to the first member, pivoting about the first member via a member pivot point, and configured to receive a pedal at a pedal interface; and
    a spring assembly configured to bias the second member towards a neutral rotation configuration relative to the first member and to resist rotation of the second member away from the neutral rotation configuration in either rotation direction, a linear distance between the crank axis and the pedal interface is greater than a linear distance between the crank axis and the member pivot point for all crank angles.

2. The crank arm of claim 1, wherein rotation of the second member away from the neutral rotation configuration during a portion of a crank stroke saves pedal force as potential energy that is released during another portion of the crank stroke when the second member rotates towards the neutral rotation configuration.

3. The crank arm of claim 1, wherein the neutral rotation configuration corresponds to a maximum distance between the crank axis and the pedal interface.

4. The crank arm of claim 1, wherein the spring assembly includes a torsion spring.

5. The crank arm of claim 1, wherein the first member is between 60% and 250% as long as the second member.

6. The crank arm of claim 1, further including a plurality of stops configured to limit the second member from rotating more than 60° from the neutral rotation configuration.

7. The crank arm of claim 6, wherein the stops are configured to limit the second member from rotating more than 30° from the neutral rotation configuration.

8. The crank arm of claim 1, wherein a distance between the crank axis and the pedal decreases as the second member rotates away from the neutral rotation configuration.

9. A crank arm in a pedal-driven vehicle, comprising:
- a first member mechanically coupled to a drive wheel and pivoting about a crank axis;
- a second member including a pedal interface and rotationally coupled to the first member at a pivot point; and
- a spring assembly coupled to the first and second members, biasing the second member toward a neutral rotational configuration relative to the first member in either rotation direction, wherein the crank axis, the pivot point, and the pedal interface are collinear with the pivot point between the crank axis and the pedal interface when in the neutral rotational configuration, and wherein a distance between the crank axis and the pivot point is less than a distance between the crank axis and the pedal interface throughout an entirety of downward and upward crank strokes.

10. The crank arm of claim 9, where the spring assembly is configured to store and release energy in a downward crank stroke.

11. The crank arm of claim 10, wherein the downward crank stroke is a rotational range of the first member from 0°-180° measured between a vertical axis extending from the crank axis and a line extending from the crank axis to the pivot point in a clockwise direction.

12. The crank arm of claim 10, wherein the spring assembly is configured to store and release energy during an upward crank stroke of the crank arm.

13. The crank arm of claim 9, wherein the spring assembly is configured to limit movement of the second member relative to the first member between a 90° and 180° angle, the angle measured between the crank axis, the pivot point, and the pedal interface.

14. The crank arm of claim 13, wherein the spring assembly includes a plurality of stops directly coupled to the first member bounding movement of the second member between the 90° and 180° angle.

15. The crank arm of claim 9, wherein the spring assembly is configured to limit movement of the second member relative to the first member between a 135° and 180° angle, the angle measured between the crank axis, the pivot point, and the pedal interface.

16. The crank arm of claim 9, wherein the spring assembly is configured to store energy when the second member is rotated away from the neutral rotational configuration and release energy when the second member is rotated toward the neutral rotational configuration.

17. The crank arm of claim 9, wherein the spring assembly is not configured to store energy in the neutral rotational configuration.

18. A crank arm for a pedal-driven vehicle, comprising:
- a first member that pivots about a crank axis of the pedal-driven vehicle;
- a second member moveably coupled to the first member, pivoting in either direction about the first member via a member pivot point, and configured to receive a pedal at a pedal interface; and
- a spring assembly operatively connected intermediate the first member and the second member and configured to save pedaling force as potential energy during a portion of a pedal stroke and to release the potential energy during another portion of the pedal stroke, wherein a linear distance between the crank axis and the pedal interface is greater than a linear distance between the crank axis and the member pivot point throughout an entirety of each 360° crank stroke.

19. The crank arm of claim 18, wherein the distance between the crank axis and the pedal interface decreases as pedaling force is saved as the potential energy.

* * * * *